3,509,062
CHEMILUMINESCENT COMPOSITION
Walter D. Lusk, Hawthorne, and James L. Dyer, Redondo Beach, Calif., assignors to TRW Inc., Redondo Beach, Calif., a corporation of Ohio
No Drawing. Filed Mar. 6, 1967, Ser. No. 620,653
Int. Cl. C09k 1/52
U.S. Cl. 252—186    2 Claims

ABSTRACT OF THE DISCLOSURE

This invention relates to an inexpensive, non-toxic, storable chemiluminescent material produced by the reaction of hydrobromic acid or hydrofluoric acid and calcium silicide. A reactivatable, high intensity light is produced when the chemiluminescent material is mixed with an inorganic oxidizer such as ceric ammonium nitrate, ceric ammonium sulfate, ceric oxide, ceric sulfate, chromium trioxide, ferric chloride, potassium hexanitrate cerate, potassium permanganate, potassium ruthenate, uranyl acetate, and uranyl nitrate. The hydrobromic acid-derived chemiluminescent material produces an orange colored light and the hydrofluoric acid-derived chemiluminescent material produces a green colored light.

---

This invention relates to two new chemiluminescent materials which belong to the family of chemiluminescent materials described in co-pending application Ser. No. 468,231, filed June 28, 1965.

In the prior-art, as taught by H. Kautsky in "Zietschrift fur Anorganische Chemie," volume 117, page 209 (1921), and by H. Kautsky and H. Zocher in "Zietschrift fur Physik," volume 9, page 269 (1921), chemiluminescent material was produced by reacting calcium silicide with hydrocloric acid in an ethanol solution and the product of that reaction was subsequently reacted with hydrobromic acid. This hydrobromic acid-derived chemiluminescent material produced a red light when reacted with ceric ammonium sulfate. While such chemiluminescent systems were interesting, practical applications were discouraging because light could not be produced unless the two components were mixed in controlled proportions by technically trained or experienced personnel.

In general, according to this invention, chemiluminescent material is produced by a direct synthesis reaction between hydrobromic acid or hydrofluoric acid and calcium silicide. This product and an inorganic oxidizer are encapsulated in separate containers in such a manner that mixing may be effected with expediency when the proper situation arises.

Preparation of the chemiluminescent materials simply constitutes mixing measured amounts of the ingredients. In the initial step to produce the hydrobromic acid-derived chemiluminescent material, concentrated hydrobromic acid is mixed with granular calcium disilicide using constant stirring, while to produce the hydrofluoric acid-derived chemiluminescent material, hydrofluoric acid is added dropwise to the granular calcium disilicide with constant stirring. The other steps in the procedure are the same for both materials. After a time sufficient to allow the initial reaction to proceed to substantial completion, boiling distilled water is added to the reaction vessel to hydrolyze the product of the initial reaction. The new product which forms by the hydrolysis reaction is filtered and washed several times with distilled water. Subsequently, the hydrolyzed material may be washed in ethanol and then in ether and the excess solvents removed in a funnel. Other means to vary the color of emitted chemiluminescent light which have been used with the hydrochloric acid-derived chemiluminescent material employ the addition of a fluorescent dye to the chemiluminescent material. Rhodamine B and methyl green in alcohol solutions which are absorbed on the surface of the chemiluminescent powder produce colored light different from the light produced by the basic powder upon reaction with the oxidizer.

Contrary to reports in the prior-art, the color of the light produced by the hydrobromic acid-derived chemiluminescent material is orange rather than red. The reason for this is not certain, but it is speculated that reason may be the method of preparation, i.e., direct synthesis rather than the prior-art method of producing hydrochloric acid-derived material with subsequent reaction of the chloride with hydrobromic acid. The hydrofluoric acid-derived chemiluminescent material was observed to give off a green light.

The following example will better illustrate the synthesis steps of the chemiluminescent material.

EXAMPLE

Approximately 50 grams of calcium silicide having a granulation equal to or greater than 32 mesh is placed in a reaction vessel. The reaction vessel is closed and 750 milliliters of concentrated hydrobromic acid is added to the calcium silicide with constant stirring. After twenty minutes of constant stirring, 1500 milliliters of boiling distilled water are added to the reaction vessel. The final reaction product is filtered and washed three times with 500, 500, 250 milliliters of distilled water, respectively. The material is then washed twice with 250 milliliters of ethanol. A final wash with two portions of 250 milliliters of ether removes the ethanol. The ether is then evaporated from the mixture by placing the mixture in a Buchner funnel and applying suction for several minutes.

Thermal stability of the chemiluminescent material is improved if oxygen, light, and foreign chemicals are excluded from the reaction system prior to activation by the user. The chemiluminescent materials retain a great proportion of their light emission potential after storage at elevated temperatures if they are stored in contact with the acids in their synthesis, i.e., the hydrobromic acid-derived chemiluminescent material is stored in contact with hydrobromic acid.

To produce the chemiluminescence, the material produced as described above is mixed with any of several inorganic oxidizers.

Inorganic oxidizers such as ceric ammonium nitrate, ceric ammonium sulfate, ceric oxide, ceric sulfate, chromium trioxide, ferric chloride, potassium hexanitrate cerate, potassium permanganate, potassium ruthenate, uranyl acetate, and uranyl nitrate have been found to be suitable. Of these oxidizers ceric ammonium sulfate has been found to be the most effective. A change of oxidizer apparently has no affect on the color of the light emitted, but it does affect the brilliance and duration of the light.

Encapsulation materials for the oxidizer and chemiluminescent material can be selected from metals, rubbers, or plastics. Plastics, such as tetrafluoroethylene, polycarbonate resins, polyethylene terephthalate, are generally preferred because they are substantially inert with respect to the oxidizer and the chemiluminescent material. Glass or rubber may also be used, however, regardless of the material which is being used, the wall structure and configuration must be such that the containers may be readily ruptured to permit mixing of the oxidizer and the chemiluminescent materials. Thin-walled metal containers are also suitable, however, special precautions must be taken to protect the metal which sometimes reacts with the oxidizer and the chemiluminescent material. Suitable protection for the metal containers may be simply a thin glass or plastic coating inside the container.

Numerous other packaging means may be employed.

The main criterion for the package is that some means is available for mixing the oxidizer and the chemiluminescent material upon the proper occasion or command. For example, the oxidizer and the chemiluminescent material may be fed from separate containers into a blending nozzle and sprayed over a desired area.

While the chemiluminescent agent and/or the oxidizing agent can be used in a solid state, gels and viscous glycerine water phases were found to be effective for expanding the light emission of the systems through diffusion control. A gelling medium which has been found particularly suitable is Cab-O-Silm-5, manufactured by the Cabot Corporation. Cab-O-Sil is a fire-dry pyrogenic silica with a particle size of about 0.015 micron, a surface area of 2000 m.$^2$/gm., and a bulk density of 2.2 lb./ft.$^3$. Water gels made from these active silica are thixotropic so that they thin down and flow when agitated, beaten, or otherwise admitted to a shearing action. Accordingly, the gels set after mixing which assist in the encapsulation of the materials, but upon the rupture of the capsules, a shearing force is produced causing the gels to flow.

In order to obtain the greatest intensity of chemiluminescent activity, a high loading of chemiluminescent material per unit weight of gel is required. Thus, although the highest possible concentration of active ingredients per unit weight of gel would seem to be the most advisable, a high percentage of solid material renders the gel highly viscous and results in a decrease in the diffusion-controlled chemiluminescent reaction rate. Thus, for optimum results, a balance must be made between the brightness and the light-emitting duration.

Numerous other aqueous gels, such as polyvinyl alcohol or glycerine, in the use of a gel, is to select one which will gel in an acid environment. Generally the chemiluminescent materials have a pH of about 1 because of traces of the acid remaining from the production of the chemiluminescent material, and therefore a material which will gel in an acid environment is required.

One of the more attractive features of these inexpensive, non-toxic chemiluminescent systems is that they may be reactivated. By suitable formulation with gelling agents, a peak brightness occurs within seconds after mixing of the chemiluminescent material and the oxidizer and then the light gradually diminishes for a period up to as long as 12 minutes under proper conditions. Remixing of the chemiluminescent material and the oxidizer will reactivate the light to a brilliance somewhat less than the original peak brightness. The mixing may be repeated several times, with each time producing a diminshed peak brightness from the time before.

We claim:
1. A chemiluminescent composition comprising:
   (1) a reaction product produced by mixing (i) a halogenic acid selected from the group consisting of hydrobromic acid and hydrofluoric acid with (ii) calcium disilicide and
   (2) an oxidizer selected from the group consisting of ceric ammonium nitrate, ceric ammonium sulfate, ceric oxide, ceric sulfate, chromium trioxide, ferric chloride, potassium hexanitrate cerate, potassium permanganate, potassium ruthenate, uranyl acetate, and uranyl nitrate.
2. A composition according to claim 1 wherein the reaction product (1) is placed in aqueous gel selected from the group consisting of silica, polyvinyl alcohol, and glycerine.

References Cited

UNITED STATES PATENTS 3,329,621   7/1967   Rauhut _____ 252—188.3

JOHN D. WELSH, Primary Examiner

U.S. Cl. X.R.

206—84; 252—188.3, 301.4, 313